United States Patent
Wexler

(10) Patent No.: US 8,214,473 B1
(45) Date of Patent: Jul. 3, 2012

(54) APPARATUS, SYSTEM, AND METHOD FOR COMMUNICATING WITH A DEVICE WITHIN A COMPUTER SYSTEM

(75) Inventor: Martin H. Wexler, San Diego, CA (US)

(73) Assignee: EMC Corporation, Hopkinton, MA (US)

( * ) Notice: Subject to any disclaimer, the term of this patent is extended or adjusted under 35 U.S.C. 154(b) by 1763 days.

(21) Appl. No.: 10/825,811

(22) Filed: Apr. 16, 2004

(51) Int. Cl.
*G06F 15/173* (2006.01)

(52) U.S. Cl. ......... 709/223; 709/224; 709/225; 709/226

(58) Field of Classification Search .................. 709/203, 709/217, 218, 219, 223, 224, 225; 710/5; 370/389

See application file for complete search history.

(56) References Cited

U.S. PATENT DOCUMENTS

| | | | |
|---|---|---|---|
| 5,890,014 A | 3/1999 | Long | |
| 6,105,122 A * | 8/2000 | Muller et al. | 709/224 |
| 6,292,876 B1 * | 9/2001 | Golding | 711/163 |
| 6,477,165 B1 * | 11/2002 | Kosco | 370/389 |
| 6,523,085 B1 | 2/2003 | Hodges et al. | |
| 6,978,345 B2 * | 12/2005 | Tomaszewski et al. | 711/112 |
| 7,039,727 B2 * | 5/2006 | Camara et al. | 710/5 |
| 7,433,327 B2 * | 10/2008 | Harville et al. | 370/260 |
| 2003/0182422 A1 * | 9/2003 | Bradshaw et al. | 709/225 |
| 2004/0064596 A1 * | 4/2004 | Erickson et al. | 710/5 |

\* cited by examiner

*Primary Examiner* — Quang N. Nguyen
(74) *Attorney, Agent, or Firm* — Krishnendu Gupta; Joseph D'Angelo

(57) ABSTRACT

An apparatus, system, and method establish communication with a target device within a computer system using an in-band communication protocol. Based on identification information received from the target device in accordance with a standard information exchange convention, a device manager identifies a nonstandard information exchange convention. A handler loaded into the device manager facilitates communication between a device caller and the target device using the nonstandard information exchange convention.

51 Claims, 3 Drawing Sheets

APPARATUS, SYSTEM, AND METHOD FOR COMMUNICATING WITH A DEVICE WITHIN A COMPUTER SYSTEM

BACKGROUND OF THE INVENTION

The invention relates in general to computer systems and more specifically to an apparatus, system, and method for communicating with a target device.

Devices within computer systems typically communicate using a standard protocol that governs the communication between the devices. Among other requirements, protocols typically determine the type of error checking methods used, the type of data compression methods used, how the transmitting device indicates that a transmission has been completed, and how the receiving device indicates that a message has been received. Examples of some of the currently utilized protocols include SCSI (Small Computer System Interface), IDE (Integrated Drive Electronics), Fibre Channel, and serial interface protocols. Numerous variations of the above-mentioned protocols, as well as other protocols, exist. Many protocols are defined by published standards allowing access to the details of the protocol to manufactures and others. Devices from different manufactures can communicate with each other if the devices comply with the published specification. In addition to the transmission and reception techniques and requirements, a particular protocol specification may indicate a standard convention for exchanging device information. The information exchange convention governs the format of the device information stored within the target device and the appropriate procedure and commands for accessing the device information. For example, the SCSI specification indicates a convention that specifies mode pages that include device information. The SCSI information exchange convention indicates the standard method to request, transmit, and format mode pages containing device information.

Although many protocols, such as SCSI, specify the standard information exchange convention, many devices that communicate using the particular protocol do not use the standard convention, incorrectly return information that was not requested, or return device information within a format that does not conform to the standard information exchange convention. Further, some device manufactures provide additional device information that is only accessible using a non-standard information exchange conventions. For example, most SCSI devices do not fully comply with the SCSI information exchange convention. Many of the mode pages specified are not available with some SCSI devices. Further, additional nonstandard mode pages providing useful device information can not be accessed using the SCSI information exchange convention.

This limitation is particularly problematic in distributed computer systems that are managed by a network manger application. Distributed computer systems include a variety of interconnected devices and may include any number of networked devices such as computers, servers, and memory storage devices that are interconnected through a network that includes a combination of network devices. A network typically includes a combination of interconnected network devices such as hubs, switches, and routers. Many of the network devices and networked devices operate in accordance with a configuration that can be set and modified. The configuration is typically managed with the use of configuration objects that represent logical or virtual arrangements and relationships and define any number of structures, allocations, operational rules, priorities, preferences, or functions related to memory, data storage, bandwidth, communication paths, and communication protocols. Many conventional systems utilize a network manager such as a network management application running on a management sever to manage the distributed computer network. The network manager communicates with network devices and networked devices to exchange information and to change configurations settings in accordance with the management tasks. Often, these communications are performed within the same communication channels where data signals are transmitted and are, therefore, typically referred to as "in-band" communications. The in-band communications comply with the protocol used within the communication channel. The SCSI protocol is commonly used in distributed computer systems as well as in integrated collocated, "local", computer systems. Using the SCSI protocol, the management application exchanges queries, acknowledgements, control signals, configuration parameters, and data with a target device which may be any network device or networked device. Devices utilize software implementing an API (Application Programming Interface) to communicate using the channel protocol and to execute various instructions.

As discussed above, however, conventional techniques are limited in that the many devices in a computer system do not conform to the standard information exchange convention dictated by the particular published specification. As a result, conventional network management applications can not effectively communicate with many target devices. Often, basic information such as a serial number is not available to the network manager through an in-band connection. Further, more efficient techniques of managing the computer system may be unavailable to the network manager because useful device information is accessible only through a nonstandard information exchange convention.

One attempted solution to this problem includes configuring the network manager to include a device manager implementing an appropriate API for each device that will be managed by the network manager. This technique is limited in that the network manager must be modified or replaced when new devices are connected within the system that utilize new, non-standard APIs. Further, since the number of potential devices utilizing non-standard APIs is expansive and continually increasing, the requirements for a standard network manager approach unmanageable complexity and size.

Accordingly, there is a need for an apparatus, system, and method for establishing communication and exchanging device information with a target device within a computer system.

DETAILED DESCRIPTION OF THE PREFERRED EMBODIMENTS

An apparatus, system, and method establish communication with a target device within a computer system. Based on identification information received from the target device, an information exchange convention (IEC) device manager utilizes a device specific handler to facilitate communication with the target device. In the exemplary embodiment, the IEC device manager receives identification information from the target device in response to a request transmitted in accordance with a standard communication protocol and in accordance with a standard information exchange convention. A device class identifier is generated from the identification information that, in the exemplary embodiment, includes manufacturer and model information of the target device. Using the device class identifier, the IEC device manager locates and loads the appropriate target device handler for communicating with the target device. The target device handler is invoked to communicate with the target device allowing the IEC device manager to operate as a translator between the target device and device caller such as a network manager. The IEC device manager appears transparent to the network manager and, from the perspective of the network manager, the target device appears to be communicating using the standard information exchange convention. In the exemplary embodiment, the IEC device manager communicates with the target device using the SCSI protocol and the handler facilitates communications by mapping device information within target device mode pages to device information within device caller mode pages.

Figure 1:
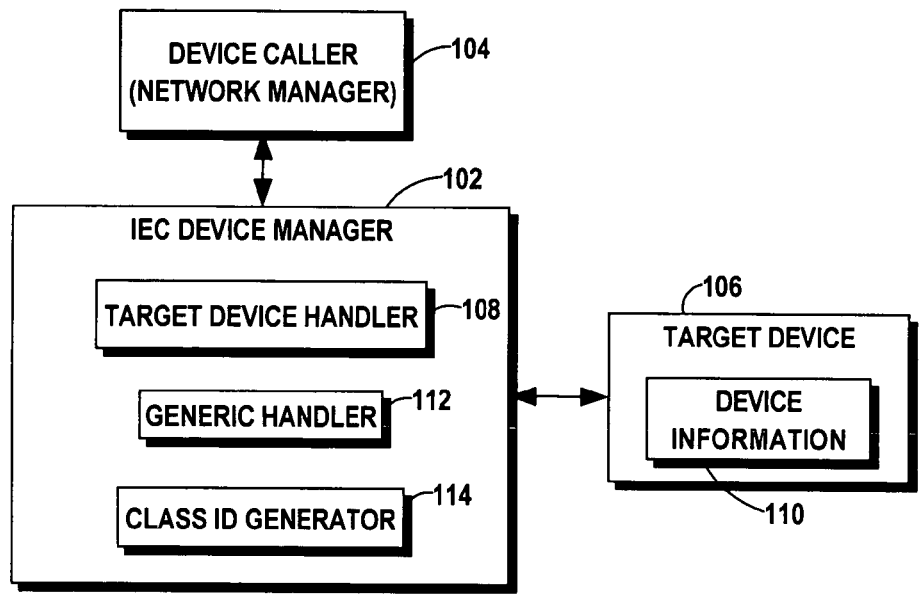
FIG. 1 is a block diagram of an information exchange convention (IEC) device manager connected to a target device and a device caller in accordance with the exemplary embodiment of the invention.

FIG. 1 is a block diagram of an information exchange convention device manager (IEC device manager) 102 connected to a device caller 104 and a target device 106 in accordance with an exemplary embodiment of the invention. The IEC device manager 102, target device 106, and the device caller 104 may be components in any of several types of computer systems where the computer system may be an integrated system with collocated components or a distributed computer system where devices are interconnected by a network. The device caller 104 is any device, engine, manager, object, or code within the computer system that exchanges information with the target device 106. The device caller 104 may be a single device or object or may include any combination of devices, software, engines or other objects depending on the particular situation. In the exemplary embodiment, the device caller 104 is a network manager (104) within a distributed computer system where the IEC device manager 102 communicates with the target device 106 using the SCSI (Small Computer System Interface) protocol. As explained below in further detail, the exemplary embodiment of the invention is particularly useful for network management in a storage area network (SAN) where target devices 106 include mass storage devices.

The IEC device manager 102 includes at least software code that facilitates communication with the target device 106. The IEC device manager 102 may be implemented solely as software running on a processor or may include any combination of software, hardware, and firmware. As discussed below in further detail, the IEC device manager 102 may be one of several device managers within a computer system that perform translation, conversion, or interface functions to allow the setting, modification, monitoring, or retrieving of identification or configuration parameters of devices.

The target device 106 is a device within the computer system that communicates in accordance with a standard protocol. In the exemplary embodiment, the target device 106 transmits and receives messages in accordance with the SCSI standard and may be a storage device, hub, switch, gateway, a module or device within a storage device, or other hardware device connected within the computer system.

A standard protocol is any protocol that is defined by a published protocol specification or is that generally accepted as a standard by the industry. A published specification defining the standard protocol typically also defines the information exchange convention. As explained above, information exchange conventions implemented in many target devices 106 are device specific conventions although the target devices 106 communicate using a standard protocol such as SCSI. The information exchange convention governs the format of the device information 110 stored within the target device 106 and the appropriate procedure and commands for accessing the device information 110. The device information 110 includes any data or information describing the configuration, performance, statistics, identity or other descriptive parameters of the target device 106. Examples of device information 110 include model numbers, manufacturer designators, serial numbers, storage capacity, speed, LUN (logical unit number), tape drive information and robot information. The information exchange convention, therefore, may be an application program interface (API) that regulates the exchange of device information 110 over the standard protocol. Where the standard protocol is SCSI, for example, the information exchange convention may indicate the appropriate mode page and the location within a mode page where particular device information 110 is stored as well as the format of the device information 110. For most target devices 106, much of the useful device information 110 stored within the target device 106 is not accessible using standard information exchange conventions. For example, some SCSI devices will not return a serial number within Mode Page 83H as required by the information exchange convention defined by the published SCSI specification.

The exemplary embodiment provides an apparatus and method for accessing device information 110 not available using the standard information exchange convention. After the target device 106 is discovered, the IEC device manager 102 requests identification information from the target device 106 using a standard information exchange convention. Using a generic handler 112, the IEC device manager 102 transmits the appropriate request (query) for the device identification information. The generic handler 112 is a routine, engine, class, or other software code that exchanges information using the standard information exchange convention. Where the standard protocol is SCSI, for example, the IEC device manager 102 transmits a request for Mode Page 83H which SCSI devices should recognize as a request for identification information. The target device 106 returns identification information that includes at least a manufacturer designation and a model number. A SCSI target device 106, for example, returns Mode Page 83H which includes at least the manufacturer designation and the model number, and, in some instances, also returns a serial number of the target device 106. Based on the device information 110 of the target device 106, the IEC device manager 102 identifies and loads the appropriate handler 108 to communicate with the target device 106. In the exemplary embodiment, the handler 108 is software code that exchanges information with the target device 106 in accordance with the information exchange convention used by the particular target device 106. The information exchange convention is often specified by the manufacturer of the target device 106 through literature, downloads, or other mechanisms. The information exchange convention is used to obtain, implement, or create the handler 108. In some circumstances, the handler 108 may be directly provided by the particular manufacturer. Further, where convention information from the manufacturer is limited, the target device handler 108 may be created based on the observed behavior of the particular target device 106.

In response to the identification information request, the target device 106 transmits the identification information to the IEC device manager 102. A class ID generator 114 within the IEC device manager 102 generates a class identifier (class ID) based on the manufacturer designation and the model number using a system defined format. The manufacturer designation is any character string or other representation of the manufacturer of the target device 106. In the exemplary embodiment, the class identifier (class ID) is a character string that represents a "Java class" for a target device handler 108 that applies to a target device 106 having a particular make and model number. The class ID, however, can be used to identify any dynamic link library (DLL), routine, engine or other code that at least partially forms the handler 108. Devices having the same manufacturer and model number will have the same class ID although the devices have different serial numbers. An example of a suitable method of forming the class ID includes using a defined algorithm or routine to combine at least a portion of the manufacturer designation and at least portion of the model number to form a character string that conforms to a consistent specified format recognized by the IEC device manager 102. The identifier generator 114, therefore, may be a module, routine, or other software code that parses and combines the incoming information to generate the class ID.

The IEC device manager 102 retrieves the handler 108 associated with the class ID from memory and loads the handler 108 into the IEC device manager 102. The device manger 102 invokes the handler 108 to gain access to the device information 110 stored within the target device 106. The handler 108 translates information between the nonstandard information exchange convention and the standard information exchange convention. In the exemplary embodiment, the handler 108 maps device information from the nonstandard mode pages to the standard mode pages and vice versa.

Each target device 106 is identified using a unique identification (UID) that is based on unique device information that distinguishes the particular target device 106 from all other target devices (106). When available, the serial number is used to generate the UID. The target device 106, however, may not return a serial number in some circumstances although the standard information exchange convention is used to retrieve the device information 110. For example, Mode Page 83H may return the manufacturer designation and the model number but not the serial number. Using the handler 108, the IEC device manager 102 retrieves the serial number, or other unique device information, from the target device 106 and creates the UID. For example, the IEC device manager 102, using the handler 108, may gain access to the serial number in a location or in a format other than prescribed by the standard information exchange convention and may use the retrieved information to generate the UID. For a SCSI target device, the IEC device manager 102 invokes the target device handler 108 that may access a mode page other than Mode Page 83H to obtain the serial number. Further, multiple devices may return the same serial number for Mode Page 83H. This may occur, for example, where a memory array includes several LUNs and each LUN is treated by the system as a separate device but the array assigns the same serial number to all the LUNs. The serial number may require modification or other processing to create the UID that will be recognized by a device caller 104. Other unique information may be used to create the UID where the serial is not available. For example, a Fibre Channel World Wide Name (WWN) may be used to create a UID. The UID is recognized as a serial number by the device caller 104 although the serial number identifier is not the actual serial number of the target device 106. Accordingly, the IEC device manager 102 allows the device caller 104 to identify and uniquely recognize the target device 106 where the target device 106 does not provide a serial number using the standard information exchange convention, the serial number does not exist, or the serial number is not unique.

A target device handler 108 is instantiated for each target device 106 in the exemplary embodiment. Therefore, if two target devices 106 have the same class ID, the target device handler 108 corresponding to the class ID is loaded and instantiated for each of the two target devices. Further, where a particular target device handler 108 applies to more than one type of target device 106, more than one class ID corresponds to the same target device handler 108.

The methods and apparatus of this invention may take the form, at least partially, of program logic or program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. When the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

In the exemplary embodiment, the logic for carrying out the method is embodied as part of the system 200 and management server 204 described with reference to FIGS. 1-3. One aspect of the invention is embodied as a method that is described below with reference to FIG. 4. In the exemplary embodiment described herein, computer readable code stored in memory 216 is executed by the processor 214 within the management server 204. Other types and combinations of hardware, software and firmware may be used implement the functions described. For purposes of illustrating the present invention, therefore, the invention is described as embodied in a specific configuration, but one skilled in the art will appreciate that the apparatus is not limited to the specific configuration but rather only by the claims included with this specification.

The IEC device manager 102 may be implemented within a computer to manage internally connected target devices 106 where the target devices 106 communicate in accordance with SCSI, Integrated Drive Electronics (IDE), Fibre Channel protocol, serial interface or other standard. Further, the IEC device manager 102 may be implemented within a distributed computer system where a variety of devices, including target devices 106, are geographically distributed and are interconnected within a computer network. In the exemplary embodiment, the IEC device manager 102 is implemented within a storage area network (SAN) and utilized by a network manager for communicating with target devices 106 to efficiently manage the SAN.

Figure 2:
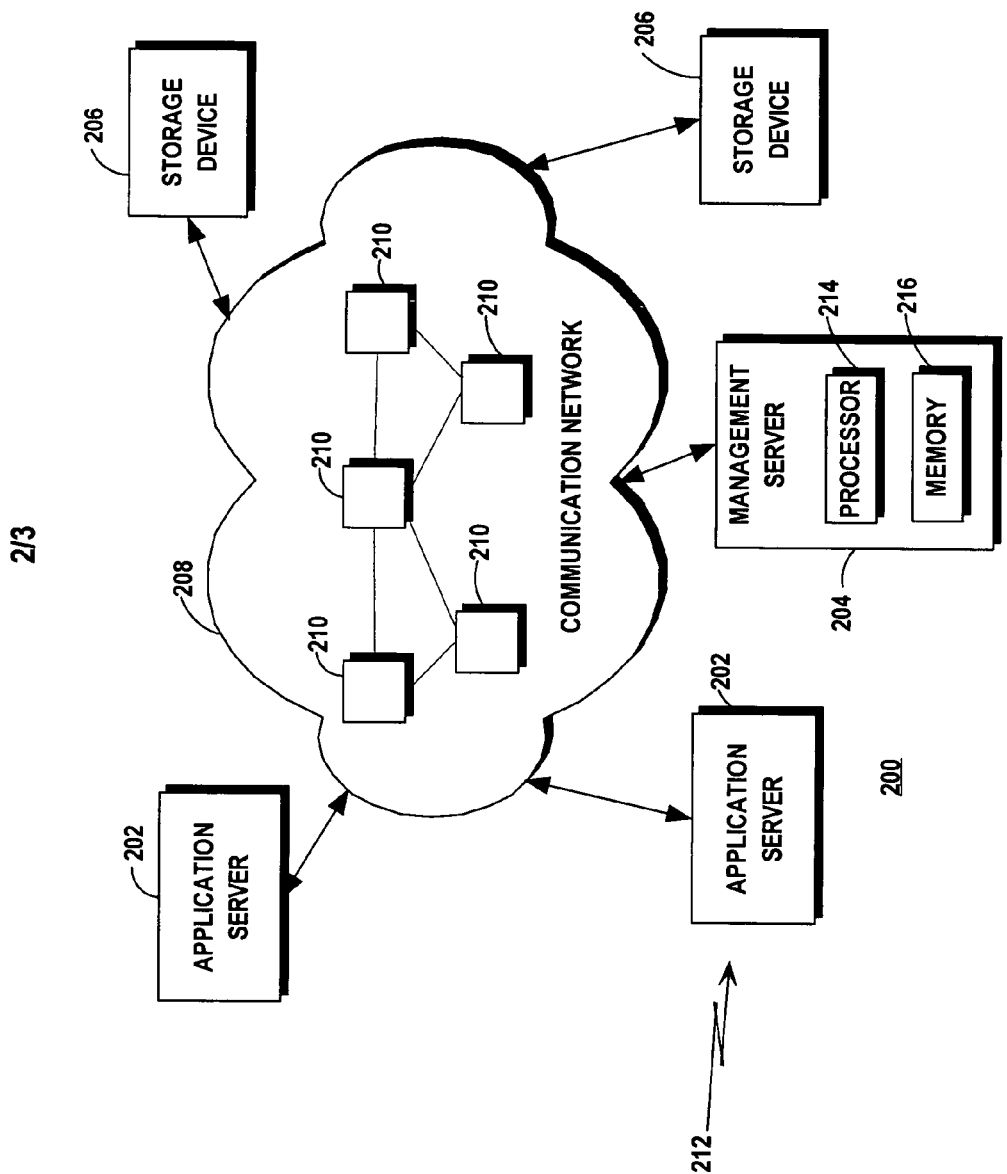
FIG. 2 is a block diagram of a distributed computer system suitable for using an IEC device manager in accordance with the exemplary embodiment of the invention.

FIG. 2 is a block diagram of a distributed computer system 200 in accordance with the exemplary embodiment of the invention. The distributed computer system 200 may include any combination of hardware, software, and infrastructure where at least a portion of the hardware is geographically distributed and interconnected through one or more communication channels. The distributed computer system 200 includes any number of networked devices 212 (202-206) connected through a network 208. Examples of networked devices 212 include storage devices 206, server computers such as application servers 202, and management servers 204. The application servers 202, the management server 204 and the storage devices 206 are collectively referred to as networked devices 212. In some circumstances, other combinations and types of networked devices 212 may be used.

The application server 202 may include any combination of processors and memory that perform the functions of a server computer that is suitable for running software applications. The applications may communicate with other networked devices 212 such as other application servers 202 and storage devices 206. In many situations, the application servers 202 may be accessed by work stations, personal computers, or other devices connected to the communication network 208.

In the exemplary embodiment, the storage devices 206 are mass storage devices such as disk drives or tape drives. Other types of storage devices 206 may be used in some circumstances. Some storage devices 206, for example, may include optical disks.

The communication network 208 includes network devices 210 that facilitate communication between networked devices 212 as well as other network devices 210. Examples of network devices 210 include hubs, routers, switches, gateways, and other hardware, infrastructure and software that facilitate the transmission of data, instructions and messages throughout the network 208. The network devices 210 may be interconnected using any of several known communication infrastructures and communication media such as wire, fiber optic cable, and wireless channels such as infrared, radio frequency (RF), microwave, satellite and optical communication channels. The various network devices such as switches and routers may operate using any protocol such (IP) (Internet Protocol), FC, and others.

Any combination of topologies can be used to implement the communication network 208 including topologies utilizing bus, star, and ring topology techniques. Further, the communication network 208 or portions of the communication network 208 may include any number of local area networks (LANs), wide area networks (WANs), and storage area networks (SANs). The communication network 208 transmits data, signals, and messages using one or more protocols. Examples of suitable protocols are protocols utilized in Ethernet and Fibre Channel networks.

Those skilled in the art will readily recognize the various topologies, protocols, architectures, and implementations of the communication network 210 and the distributed computer system 200 that can be used based on these teachings and known techniques. The functions and operations of the blocks described in FIG. 2 may be implemented in any number of devices, circuits, or infrastructure. Two or more of the functional blocks may be integrated in a single device and the functions described as performed in any single device may be implemented over several devices. For example, a hardware component within the system 200 may operate as a networked device 212 as well as a network device 210 in some situations.

The management server 204 includes at least a processor 214 and a memory 216 for running system management software (network manager) and other software facilitating the overall functionality and operation of the management server 204. The processor 214 is any type of processor, processor arrangement, microprocessor, or computer configured to execute computer readable code and includes one or more processors or computers. At least a portion of the memory 216 includes a non-volatile memory medium suitable for storing the computer readable code such as a disk drive.

In the exemplary embodiment, the management server 204 is a server computer running system management software (network manager) that utilizes one or more device managers to communicate with the network devices 210 and networked devices 212 (202, 206) where at least one of the device managers is an information exchange convention device manager (IEC device manager) 102. The device managers include at least software code that performs translation, conversion or interface functions to allow the management server 204 to set, change, monitor or retrieve configuration parameters of a network device 210 or a networked device 212. In some circumstances, the implementation and operation of the device managers depend on the particular devices 210, 202, 206 that are accessed, the information that is exchanged and other factors related to the distributed communication system 100 and the network manager 104. Depending on the particular device 210, 212, the device managers, or portions of the device managers, may be commercially available or may be specifically constructed based on the particular protocol and other requirements of the devices 210, 212. The functionality of the device managers may be implemented in a single manager or computer program or may be distributed over several hardware devices, programs, subprograms or subroutines.

As discussed above, the IEC device manager 102 dynamically loads and executes handlers 108 to establish in-band communication between the network manager 104 and a target device 106. In the exemplary embodiment, the target device 102 is any network device 210 or networked device 212 connected within the network 108 that is accessible by the network manager 104 through the communication network 208. Any of the networked devices 212 or network devices 208, therefore, may be a target device 106. For example, the target device 106 may be a mass storage device 206, a router, hub, switch, gateway, and or other hardware device. During operation, the network manager 104 communicates with the various networked devices 212 and network devices 210 to appropriately establish and modify the configuration of the distributed computer system 200. In order to effectively execute management tasks, the network manager 104 may require device information 110 characterizing the network devices 210 and networked devices 212. The network manager 104, for example, may require the capacity of a storage device 206 or a LUN number. In some situations, the network manager 104 communicates "out-of-band" with devices using SNMP (Simple Network Management Protocol). Often, however, this communication technique is less than adequate for several reasons. For example, the infrastructure may not allow out-of-band communication between the network manager 104 and the particular target device 106. Further, it may not be possible to determine if the target device 106 is adequately connected within the system 200 when communicating with the target device 106 through an out-of-band communication link. Also, an out-of-band communication such as SNMP may not provide some of the useful device information 110 that is available through an in-band communication link.

During operation, the network manager 104 communicates in-band with the target device 106 through the IEC device manager 102. The communications between the IEC device manager 102 and the network manager 104 may use any protocol or communication standard. In the exemplary embodiment, the interface between the network manager 104 and the device manager is in accordance with an API, RMI (Remote Method Invocation) or RPC (Remote Procedure Call). The IEC device manager 102 establishes communications between the network manager 104 and the target device 106 by identifying and utilizing a target device handler 108 to communicate with the target device 106 and by using a standard information exchange convention to communicate with the network manager 104. As explained below in further detail, information obtained through the in-band link is reconciled with information that is received through an out-of-band link allowing the network manager 104 to establish an accurate representation of the computer system 200.

Figure 3:
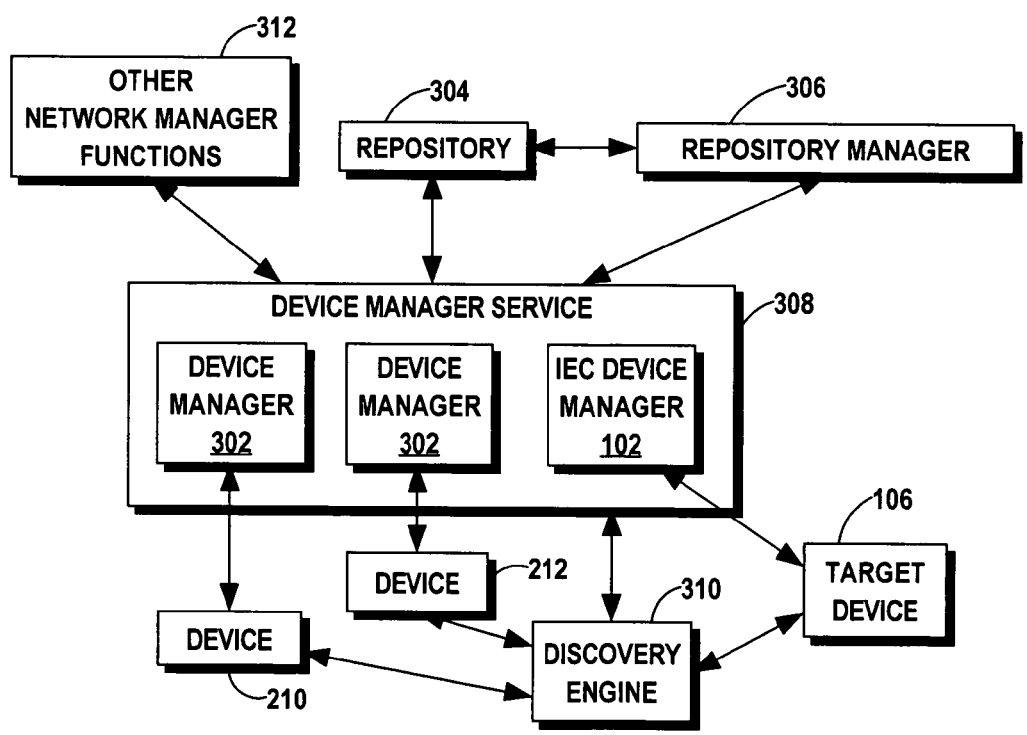
FIG. 3 is a block diagram of an IEC device manager connected within an exemplary environment.

FIG. 3 is a block diagram of the IEC device manager 102 connected within an exemplary operating environment. As described above, the network manager 104 is a software program implemented within the management server 204 that manages the distributed computer system 200. The network manger 104 may include any number of engines, functions and routines that exchange information and perform various tasks and services. The blocks in FIG. 3 represent the services, managers and engines that directly or indirectly service the IEC device manager 102. Although the functions may be implemented as external routines, engines or services, some or all of the functions represented in FIG. 3, as well as other functions, are implemented within the network manager 104 in the exemplary embodiment. The functions may be distributed over two or more hardware devices in some circumstances. Accordingly, the blocks within FIG. 3 do not necessarily represent individual devices or individual software modules and only represent an exemplary arrangement of functions, engines, and managers. The various managers and functions discussed with reference to FIG. 3, therefore, may be implemented using any of several techniques, operating systems, programming languages, hardware, and software.

In the exemplary embodiment, the network manager 104 is a software program running on the management server 204. The management server 204 includes any combination of processors 214 and memory 216 suitable for executing software code to facilitate the operation of the network manager 104 and the IEC device manager 102. In the exemplary embodiment, the IEC device manager 102 is a program running on the management server 204 as part of the network manager 104 application. The IEC device manager 106, however, may be implemented on other hardware devices, computers, or servers that are either remotely located or co-located with the network manager 204.

Device information obtained by one or more device managers 102, 302 is stored in a repository 304 and is associated with each target device 106 in the system 200. The repository manager 306 manages the repository 304 and resolves conflicts and correlates device information associated with each target device 106. The repository manager 306 generates a compiled representation from device information received from multiple sources. For any target device 106, device information may be obtained through multiple device managers 302, 102. For example, a device manger 302 may communicate with a particular target device 106 using an "out-of-band" communication link, such as a link using SNMP for example, and the IEC device manager 102 may communicate with the same target device 106 using an "in-band" communication link such as a link conforming to the SCSI protocol. A single UID is used to represent each target device 106 allowing the network manager 104 to obtain an accurate representation of the configuration of the system 200.

The device managers 102, 302 run within a device manager service 308. The device manger service 308 provides an environment suitable for running the device managers 102, 302 and provides support services to the device managers 102, 302. The device manager service 308 also provides an interface to other network manager functions 312.

A target device 106 may be discovered by a discovery engine 310 or by the device managers 102, 302. The discovery engine 310 reports to the device manager service 308 any device (210, 212, 106) (target device 106), that has not yet been identified and provides information that identifies the newly discovered device 106. In response, the appropriate device manager (102, 302) is invoked to manage the device 106.

Therefore, the IEC device manager 102 is implemented within a computer system to provide access to device information 108 within target devices 106 that do not fully comply with the information exchange convention of the standard protocol that is followed within the computer system. The target device handler 108 corresponding to the nonstandard information exchange convention followed by the target device 106 provides translation functions between the nonstandard convention and a system accepted convention such as a standard information exchange convention. In some situations, the convention used by the system 200 may also be a nonstandard convention.

Figure 4:
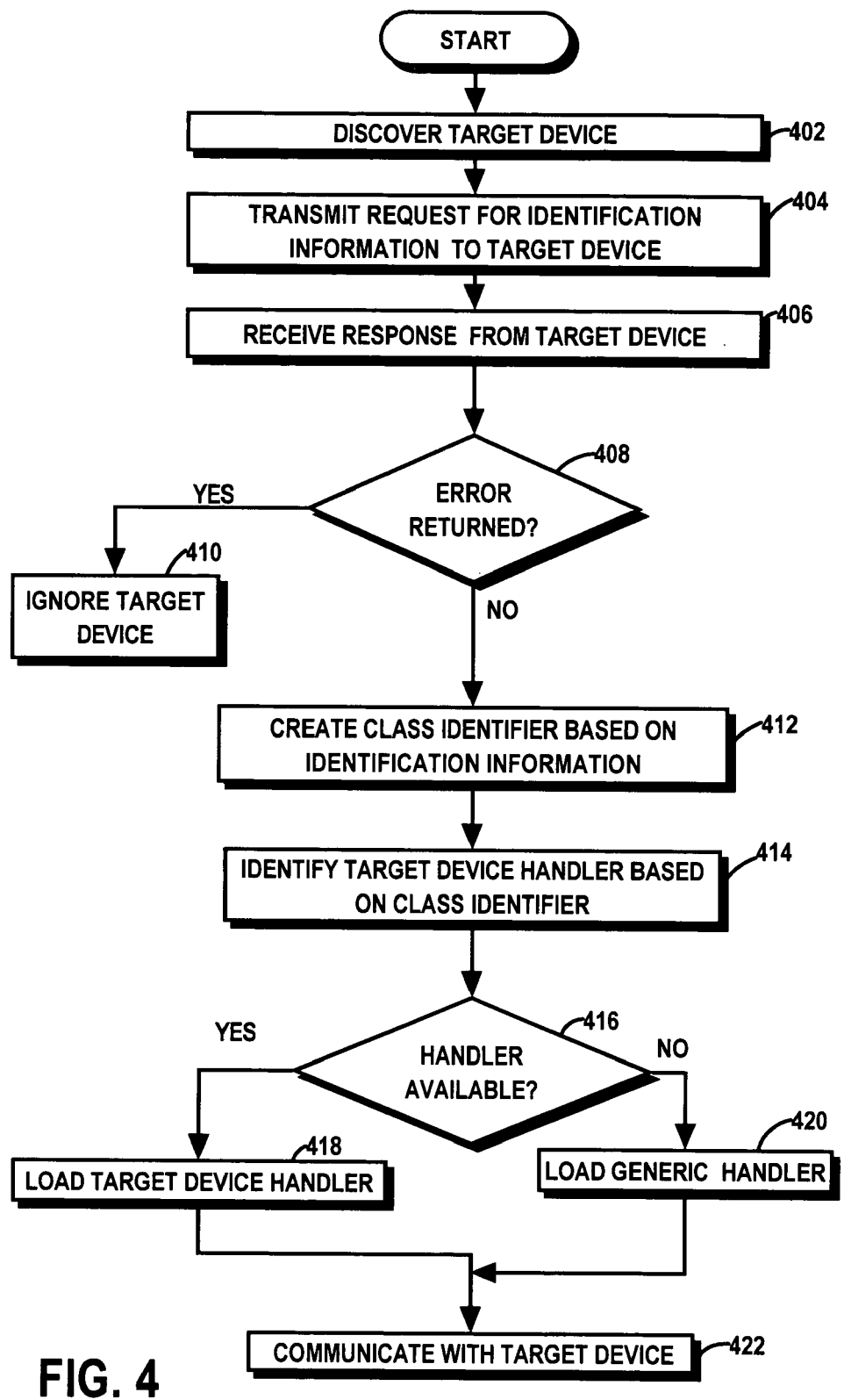
FIG. 4 is a flow chart of a method of communicating with a target device in accordance with the exemplary embodiment of the invention.

FIG. 4 is flow chart of a method of establishing communication between the device caller (network manager) 104 and a target device 106 in accordance with the exemplary embodiment of the invention. Although the method may be performed by any combination hardware and software and within any device or application, the method is performed by the IEC device manager 102 operating within the computer system 200 in the exemplary embodiment.

At step 402, the target device 106 is discovered. In the exemplary embodiment, a device manager 302, using a host bus adapter (NBA), performs a query for all SCSI devices that can be accessed by the device manager 302. As is known, an HBA is an I/O adapter that exchanges information with the Fibre Channel connection and manages transfer of information between the Fibre Channel and the device manager service. The query returns at least one target device 106. The information received from the query is limited to the discovery of the target devices 106.

At step 404, a request for identification information is transmitted in accordance with the standard information exchange convention. The request is a query for identification information transmitted to the target device 106. In the exemplary embodiment, the IEC device manager 102 uses a generic handler 112 to transmit a "universal" command that requests the target device manufacturer designation and the target device model. As is known, such a universal, standard request will be recognized by nearly all devices that communicate using the SCSI protocol. In the exemplary embodiment, a request is transmitted for Mode Page 83H using the standard information exchange convention for SCSI.

At step 406, a response to the request for identification information is received from the target device 106. In the exemplary embodiment, the response either includes data or indicates that an error has occurred. If the response includes data, the data returned for the manufacturer designation and the model number is used as the identification information. In some circumstances, the returned data may not directly describe the device manufacturer or the model number. Since the data is unique to the type of target device, however, the data returned for the device manufacturer designation and the data returned for the device model number are used to identify the target device 106 even though the data may not indicate the actual manufacturer or model number. The data returned in the response to the request, therefore, is used as identification information. Where an error is returned, the target device 106 is ignored and is not supported as discussed below. In the exemplary embodiment, the response for Mode Page 83H is returned. In some situations, a serial number of the target device 106 may also be returned in response to the request.

At step 408, it is determined if an error is returned in response to the request for identification information. If an error is returned, the procedure continues at step 410 where the target device 106 is ignored. Otherwise, the procedure continues at step 412. Therefore, if an error is returned, it is determined that the target device 106 is not supported and the target device 106 is ignored. Otherwise, at least an attempt is made to support the device using the data returned representing the identification information.

At step 412, a class identifier (class ID) is created based on the identification information. In the exemplary embodiment, the class ID generator 114 generates a character string based on the manufacturer designation and the model number of the target device 106. The following example illustrates one of the numerous identifier generation procedures that can be performed in accordance with the exemplary embodiment. Assuming the target device 106 is an EMC Clariion CX500 network storage system, the IEC device manager 102 transmits the identification information request (such as a request for Mode Page 83H) to the target device 202 using the SCSI protocol. In response, the target device 106 returns identification information indicating that the target device is an EMC device and that the model of the target device 106 is CLARIION500. The IEC device manager 102 receives the information and generates the character string: "EMCCLAR500". The class identifier, however, may be generated in other ways depending on the particular system 200 and system format. In some situations, the model number and the manufacturer designator may be returned as blank. In such situations, the generic handler is loaded to attempt to obtain data that uniquely identifies the type of target device 106. Accordingly, additional procedures may be invoked depending on the particular data returned in response to the identification request.

In the exemplary embodiment, several target devices 106 may be associated with the same class identifier (class ID) since devices within the system 200 having the same make and model will result in the generation of the same class identifier (class ID). As explained below, no two devices will have the same unique identifier (UID).

At step 414, the target device handler 110 is identified based on the class identifier (class ID). In the exemplary embodiment, the IEC device manager 102 searches a database of handlers to locate the handler 108 that is associated with the same class identifier (class ID) as the target device 106.

At step 416, the IEC device manager 102 determines if the handler 108 is available. If the handler 108 is available, the procedure loads the target device handler 108 at step 418. Otherwise, the procedure continues at step 420 where the generic handler 112 is loaded.

At step 418, the target device handler 108 is loaded into the IEC device manager 102. The code corresponding to the target device handler 108 is retrieved and loaded into the appropriate location with the IEC device manager 102 in accordance with known techniques. In the exemplary embodiment, the IEC device manager 102 locates and loads the particular Java class corresponding to the class ID and loads the class (bytecode) into the IEC device manager 102. Where the IEC device manager 102 is implemented in a windows operating system, the dynamic link library (DLL) or shared library corresponding to the Class ID is loaded into the device manager 206. The target device handler 108 code, therefore, may be a Java Class, dynamic link library (DLL), subroutine, or other type of software code that when loaded into the device manager performs the functions of the device protocol adapter.

At step 422, the IEC device manager 102 uses the loaded handler 108 to communicate with the target device 106 and access the device information 110 within the target device 106. The IEC device manager 102 maps device information 110 received from the target device 106 to communication conforming to the standard information exchange convention to forward information to the device caller (network manager) 104. For example, if a communication is received from the device caller 104 requesting the serial number of the target device 106, the IEC device manager 102 uses the handler to obtain the serial number from the target device 106 and to place the serial number in a format in accordance with the standard information exchange convention. In some circumstances, the device information 110 may require modification prior to presenting the device information 110 to the device caller 104 in order place the device information in the format conforming to the standard information exchange convention. For example, if the target device 106 information exchange convention provides an expanded version of the serial number at Mode Page 85H, the handler 108 truncates the serial number to the appropriate size and provides Mode Page 83H with the serial number to the device caller (network manager) 104.

In the exemplary embodiment, the UID represents the serial number of the target device 106. In situations where the serial number can not be obtained, the IEC device manager 102 utilizes other unique device information to create a UID that will be interpreted by the device caller 104 as a legitimate serial number conforming to the standard information exchange convention. For example, the IEC device manager 102 may use a Fibre Channel WWN (World Wide Name) to create the UID in some circumstances.

The UID of the target device 106 is associated with the loaded target device handler 108. When a device caller 104 communicates with the particular target device 106, the associated handler 108 is invoked to provide the translation between the standard information exchange convention and the nonstandard information exchange convention used by the target device 106. Using the target device handler 108, the IEC device manager 102 can perform a variety of tasks and obtain device information 110 through an in-band connection that would not be possible using a standard information exchange convention. The custom target device handler 108 allows access to device information 110 that is located or formatted using non-standard techniques. Further, the target device handler 108 provides access to custom mode pages that are provided in addition to the standard mode pages specified by SCSI. Some examples of device information 110 that can be obtained using the custom target device handler 108 that otherwise may not be available for a specific target device 106 include the SCSI LUN Number, speed of the target device 106, tape drive information and robot information. Further the network manager 104 may perform tasks that would not be possible through an in-band connection without the custom target device handler 108 such as performing a "ping". As is known, a ping allows the network manager 104 to determine if a particular target device is available.

In the exemplary embodiment, the procedure described above with reference to FIG. 4 is repeated for each target device 106 that is discovered. In a computer system 200 having several different target devices 106, therefore, each device target device 106 is discovered and a handler 108 is loaded for each target device 106 to facilitate in-band communication with all of the target devices 106.

Therefore, to establish communication with a target device 106, the IEC device manager 102 transmits a request for identification information using a standard information exchange convention through the distributed computer system 200 to the target device 106. In response, the target device 106 transmits the identification information to the IEC device manager 102. In the exemplary embodiment, the identification information includes at least the name of the manufacturer and the model of the target device 106. The IEC device manager 102 generates a Class ID based on the identification information and retrieves the target device handler 108 corresponding to the target device 106 using the Class ID. The handler 108 is used to communicate with the target device 106 while a standard, or otherwise consistent, information exchange convention is used to communicate with the network manager 104. The IEC device manager 102 translates communications to allow the network manger 104 to communicate with each target device 106 using an in-band communication link. New devices added to the distributed computer system 200 are accommodated by loading the appropriate handlers 108 eliminating the need to modify the network manger 104.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method for communicating with a target device, the method comprising:
   receiving identification information of a target device in accordance with a standard information exchange convention defined by a published standard;
   generating a class identifier based on the identification information;
   using the class identifier to identify a nonstandard information exchange convention that is not defined by the published standard;
   using the nonstandard information exchange convention or the class identifier to identify a target device handler;
   determining the availability of the identified target device handler;
   based on a positive determination, using the identified target device handler associated with the target device to communicate with the target device; wherein communicating with the target device comprises exchanging target device information in accordance with the nonstandard information exchange convention;
   based on a negative determination, loading a generic device handler and attempting communicating with the target device using the standard information exchange convention.

2. A method in accordance with claim 1, wherein the communicating with the target device comprises receiving device information complying with the nonstandard information exchange convention.

3. A method in accordance with claim 2, wherein the target device is a memory device and the device information comprises a capacity of the memory device.

4. A method in accordance with claim 2, wherein the target device is part of a memory device and the device information comprises a logical unit number (LUN) of the target device.

5. A method in accordance with claim 1, wherein the standard information exchange convention is in accordance with Small Computer System Interface (SCSI) protocol.

6. A method in accordance with claim 5, wherein receiving the identification information comprises: receiving Mode Page 83H transmitted from the target device in accordance with the Small Computer System Interface (SCSI) protocol, the Mode Page 83H comprising a manufacturer designation and a model number.

7. A method in accordance with claim 5, wherein receiving the identification information comprises:
   receiving a mode page transmitted from the target device in accordance with the Small Computer System Interface (SCSI) protocol, the mode page selected from the group consisting of Mode Page OOH, Mode Page 80H, Mode Page 81H, Mode Page 82H, and Mode Page 83H.

8. A method in accordance with claim 1, wherein the identification information comprises a device model number.

9. A method in accordance with claim 8, wherein the identification information comprises a device manufacturer designation.

10. A method in accordance with claim 1, further comprising: loading the target device handler into an information exchange convention (IEC) device manager.

11. A method in accordance with claim 1, wherein the identification information comprises a device manufacturer and a device model number.

12. A method in accordance with claim 1, further comprising: communicating with a device caller using the standard information exchange convention, wherein the communicating with the device caller comprises exchanging the target device information with the device caller in accordance with the standard information exchange convention.

13. A method in accordance with claim 1, wherein the device caller is a network manager.

14. The method in accordance with claim 1, wherein the nonstandard information exchange convention is defined by a modified version of the published standard that defines the standard information exchange convention.

15. A method of communicating with a target device, the method comprising:
   transmitting, a query command in accordance with a standard information exchange convention defined by a published standard, the standard information exchange convention defining a format for information transmitted in accordance with a protocol;
   receiving identification information from the target device in accordance with the standard information exchange convention, the identification information comprising a manufacturer designator and a model number;
   generating a class identifier based on the identification information;
   determining the availability of a target device handler corresponding to the class identifier;
   based on a positive determination, loading the target device handler corresponding to the class identifier into an information exchange convention (IEC) device manager; and using the target device handler to exchange target device information with the target device in accordance with a nonstandard information exchange convention that is not defined by a published standard;
   based on a negative determination, loading a generic device handler to attempt to exchange the target device information with the target device using the standard information exchange convention.

16. A method in accordance with claim 15, wherein the target device information comprises a capacity of a mass storage device.

17. A method in accordance with claim 15, wherein the target device information comprises a logical unit number (LUN) of a mass storage device.

18. A method in accordance with claim 17, wherein the LUN is based on storage system characterization.

19. A method in accordance with claim 17, wherein the LUN is based on a host computer characterization.

20. A method in accordance with claim 15, wherein the published standard is a Small Computer System Interface (SCSI) published standard.

21. A method in accordance with claim 20, wherein the query command is a request for Mode Page 83H.

22. A method in accordance with claim 20, wherein the query command is a request for a mode page selected from the group consisting of Mode Page 00H, Mode Page 80H, Mode Page 81H, Mode Page 82H, and Mode Page 83H.

23. The method in accordance with claim 15, wherein the nonstandard information exchange convention is defined by a modified version of the published standard that defines the standard information exchange convention.

24. An information exchange convention (IEC) device manager comprising:
  computer-executable logic stored on a non-transitory computer readable medium, the computer-executable logic configured to cause the following steps to occur:
    receiving identification information of a target device in accordance with a standard information exchange convention defined by a published standard;
    generating a class identifier based on the identification information;
    using the class identifier to identify a nonstandard information exchange convention that is not defined by a published standard;
    using the nonstandard information exchange convention or the class identifier to identify a target device handler;
    determining the availability of the identified target device handler;
    based on a positive determination, using the identified target device handler associated with the target device to communicate with the target device; wherein communicating with the target device comprises exchanging target device information in accordance with the nonstandard information exchange convention;
    based on a negative determination, loading a generic device handler and attempting communicating with the target device using the standard information exchange convention.

25. A (IEC) device manager in accordance with claim 24, wherein the communicating with the target device comprises receiving device information complying with the nonstandard information exchange convention.

26. A (IEC) device manager in accordance with claim 25, wherein the target device is a memory device and the device information comprises a capacity of the memory device.

27. A (IEC) device manager in accordance with claim 24, wherein the standard information exchange convention is in accordance with Small Computer System Interface (SCSI) protocol.

28. A (IEC) device manager in accordance with claim 24, wherein the identification information comprises a device model number.

29. A (IEC) device manager in accordance with claim 28, wherein the identification information comprises a device manufacturer designation.

30. An IEC device manager in accordance with claim 24, wherein the nonstandard information exchange convention is defined by a modified version of the published standard that defines the standard information exchange convention.

31. An information exchange convention (IEC) device manager comprising:
  computer-executable logic stored on a non-transitory computer readable medium, the computer-executable logic configured to cause the following steps to occur:
    configuring a generic device handler to receive identification information of a target device in accordance with a standard information exchange convention defined by a published standard;
    configuring a class identifier generator to generate a class identifier based on the identification information;
    using the class identifier to identify a nonstandard information exchange convention that is not defined by a published standard;
    determining the availability of a target device handler corresponding to the class identifier; and
    based on a positive determination, configuring the target device handler corresponding to the class identifier to communicate with the target device using the nonstandard information exchange convention that is not defined by the published standard;
    based on a negative determination, loading the generic device handler and attempting communicating with the target device using the standard information exchange convention.

32. An IEC device manager in accordance with claim 31, wherein the nonstandard information exchange convention is defined by a modified version of the published standard that defines the standard information exchange convention.

33. An information exchange convention (IEC) device manager comprising:
  computer executable logic stored on a non-transitory computer readable medium, the computer executable logic comprising:
    a receiving means for receiving identification information of a target device in accordance with a standard information exchange convention defined by a published standard;
    a generating means for generating a class identifier based on the identification information;
    an identifying means for identifying a nonstandard information exchange convention that is not defined by a published standard based on the class identifier;
    a determining means for determining the availability of a target device handler corresponding to the class identifier and for determining if the EIC device manager can communicate with the target device using the target device handler corresponding to the class identifier in accordance with the non-standard information exchange convention that is not defined by a public standard; and
    based on a positive determination, communicating with the target device using the target device handler corresponding to the class identifier in accordance with the non-standard information exchange convention;
    based on a negative determination, loading a generic handler to attempt to exchange information with the target device using the standard information exchange convention.

34. An IEC device manager in accordance with claim 33, wherein the target device is a memory device and the device information comprises a capacity of the memory device.

35. An IEC device manager in accordance with claim 33, wherein the target device is part of a memory device and the device information comprises a logical unit number (LUN) of the target device.

36. An IEC device manager in accordance with claim 33, wherein the standard information exchange convention is in accordance with Small Computer System Interface (SCSI) protocol.

37. An IEC device manager in accordance with claim 36, the receiving means for receiving Mode Page 83H transmitted from the target device in accordance with the Small Computer System Interface (SCSI) protocol, the Mode Page 83H comprising a manufacturer designation and a model number.

38. An IEC device manager in accordance with claim 36, the receiving means for receiving a mode page transmitted from the target device in accordance with the Small Computer System Interface (SCSI) protocol, the mode page selected from the group consisting of Mode Page OOH, Mode Page 80H, Mode Page 81H, Mode Page 82H, and Mode Page 83H.

39. An IEC device manager in accordance with claim 33, wherein the identification information comprises a device model number.

40. An IEC device manager in accordance with claim 39, wherein the identification information comprises a device manufacturer designation.

41. An IEC device manager in accordance with claim 33, further comprising:
    a device caller communication means for communicating with a device caller using the standard information exchange convention.

42. An IEC device manager in accordance with claim 41, wherein the device caller communication means comprises a device caller exchanging means for exchanging the target device information with the device caller in accordance with the standard information exchange convention.

43. An IEC device manager in accordance with claim 33, wherein the device caller is a network manager.

44. An IEC device manager in accordance with claim 33, wherein the nonstandard information exchange convention is defined by a modified version of the published standard that defines the standard information exchange convention.

45. A program product for communicating with a target device, the program product comprising:
    computer-executable logic contained on a non-transitory computer-readable medium and configured for causing the following computer-executed steps to occur:
        receiving identification information of a target device in accordance with a standard information exchange convention defined by a published standard;
        generating a class identifier based on the identification information;
        using the class identifier to identify a nonstandard information exchange convention that is not defined by a published standard;
        using the nonstandard information exchange convention or the class identifier to identify a target device handler;
        determining the availability of the identified target device handler;
        based on a positive determination, using the identified target device handler associated with the target device to communicate with the target device; wherein communicating with the target device comprises exchanging target device information in accordance with the nonstandard information exchange convention;
        based on a negative determination, loading a generic device handler and attempting to exchange information with the target device using the standard information exchange convention defined by a published standard.

46. A program product in accordance with claim 45, wherein the target device is a memory device and the device information comprises a capacity of the memory device.

47. A program product in accordance with claim 45, wherein the standard information exchange convention is in accordance with Small Computer System Interface (SCSI) protocol.

48. A program product in accordance with claim 47, wherein receiving the identification information comprises:
    receiving Mode Page 83H transmitted from the target device in accordance with a Small Computer System Interface (SCSI) protocol, the Mode Page 83H comprising a manufacturer designation and a model number.

49. A program product in accordance with claim 47, wherein the identification information comprises a device model number.

50. A program product in accordance with claim 49, wherein the identification information comprises a device manufacturer designation.

51. A program product in accordance with claim 45, wherein the nonstandard information exchange convention is defined by a modified version of the published standard that defines the standard information exchange convention.

* * * * *